US009819206B2

(12) United States Patent
Keskin et al.

(10) Patent No.: US 9,819,206 B2
(45) Date of Patent: Nov. 14, 2017

(54) FASTER BATTERY CHARGING IN CONSUMER ELECTRONIC DEVICES

(71) Applicant: QUALCOMM Incorporated, San Diego, CA (US)

(72) Inventors: Mustafa Keskin, San Diego, CA (US); Hani Ahmad-Assi, San Diego, CA (US); Paul Brian Sheehy, San Diego, CA (US); Robert Philip Gilmore, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 239 days.

(21) Appl. No.: 14/604,605

(22) Filed: Jan. 23, 2015

(65) Prior Publication Data

US 2016/0218541 A1 Jul. 28, 2016

(51) Int. Cl.
*H02J 7/00* (2006.01)

(52) U.S. Cl.
CPC ............ *H02J 7/0057* (2013.01); *H02J 7/007* (2013.01); *H02J 7/0055* (2013.01); *H02J 7/0068* (2013.01); *H02J 2007/0062* (2013.01); *H02J 2007/0095* (2013.01)

(58) Field of Classification Search
CPC .. H02J 7/025; H02J 5/005; H02J 17/00; H02J 50/12; H02J 3/383; H02J 50/40; H02J 7/35; H02J 50/80; H02J 7/0068; H02J 7/007; H02J 9/061; H02J 7/0021; H02J 1/10; H02J 3/00; H02J 3/005
USPC .................................. 320/137–140
See application file for complete search history.

(56) References Cited

U.S. PATENT DOCUMENTS

| 2010/0207572 A1 | 8/2010 | Kirby et al. |
| 2011/0006603 A1* | 1/2011 | Robinson ............... G06F 1/263 307/31 |
| 2012/0032518 A1 | 2/2012 | Huang et al. |
| 2012/0235636 A1 | 9/2012 | Partovi |

(Continued)

FOREIGN PATENT DOCUMENTS

| EP | 2590050 A1 | 5/2013 |
| WO | 2008030168 A1 | 3/2008 |

OTHER PUBLICATIONS

International Search Report and Written Opinion—PCT/US2015/067682—ISA/EPO—Apr. 5, 2016.

(Continued)

*Primary Examiner* — Binh Tat
(74) *Attorney, Agent, or Firm* — Arent Fox, LLP

(57) ABSTRACT

In an aspect of the disclosure, a method, a computer-readable medium, and an apparatus are provided. The apparatus detects a level of power received from each of a plurality of sources. The apparatus directs the power received from a first source to a charging circuit and directs the power received from at least a second source to the charging circuit. The apparatus directs the power received from the first source to the charging circuit by comparing the detected level of the power with a threshold and directing the power to the charging circuit based on a result of the comparison. The apparatus directs the power received from the at least a second source to the charging circuit by comparing the detected level of the power with the threshold and directing the power to the charging circuit based on a result of the comparison.

22 Claims, 6 Drawing Sheets

(56) References Cited

U.S. PATENT DOCUMENTS

| | | | |
|---|---|---|---|
| 2013/0020875 A1 | 1/2013 | Wozniak et al. | |
| 2013/0241468 A1 | 9/2013 | Moshfeghi | |
| 2013/0285620 A1* | 10/2013 | Yamamoto | H02J 7/025 320/155 |
| 2013/0307346 A1* | 11/2013 | Arisawa | H02J 7/025 307/104 |
| 2013/0307464 A1 | 11/2013 | Zhu | |
| 2013/0307468 A1* | 11/2013 | Lee | H02J 7/0052 320/108 |
| 2014/0028244 A1* | 1/2014 | Korekoda | B60L 11/1812 320/106 |

OTHER PUBLICATIONS

Park G., et al., "Energy Harvesting for Structural Health Monitoring Sensor Networks," ASCE Journal of Infrastructure Systems, Mar. 2008, vol. 14 (1), pp. 70.

Bandyopadhyay S., et al., "Platform Architecture for Solar, Thermal, and Vibration Energy Combining With MPPT and Single Inductor", IEEE Journal of Solid-State Circuits, Sep. 2012, vol. 47, No. 9, pp. 2199-2215.

Collado A., et al., "Conformal Hybrid Solar and Electromagnetic (EM) Energy Harvesting Rectenna", IEEE Transactions on Circuits and Systems I: Regular Papers, Aug. 2013, vol. 60, No. 8, pp. 2225-2234.

Li B., et al., "An Antenna Co-Design Dual Band RF Energy Harvester", IEEE Transactions on Circuits and Systems I: Regular Papers, Dec. 2013, vol. 60, No. 12, pp. 3256-3266.

Linear Technology, "Nanopower Buck-Boost DC/DC with Energy Harvesting Battery Charger", LTC3331, 2014, 34 pages.

Mitcheson P.D., et al., "Tuning the Resonant Frequency and Damping of an Electromagnetic Energy Harvester Using Power Electronics", IEEE Transactions on Circuits and Systems II: Express Briefs, Dec. 2011, vol. 58, No. 12, pp. 792-796.

Sauer C., et al., "Power Harvesting and Telemetry in CMOS for Implanted Devices", IEEE Transactions on Circuits and Systems I: Regular Papers, Dec. 2005, vol. 52, No. 12, pp. 2605-2613.

Soltani N., et al., "A High-Gain Power-Matching Technique for Efficient Radio-Frequency Power Harvest of Passive Wireless Microsystems", IEEE Transactions on Circuits and Systems I: Regular Papers, Oct. 2010, vol. 57, No. 10, pp. 2685-2695.

Zhao W., et al., "A Radio-Frequency Energy Harvesting Scheme for Use in Low-Power Ad Hoc Distributed Networks", IEEE Transactions on Circuits and Systems II: Express Briefs, Sep. 2012, vol. 59, No. 9, pp. 573-577.

\* cited by examiner

FASTER BATTERY CHARGING IN CONSUMER ELECTRONIC DEVICES

BACKGROUND

Field

The present disclosure relates generally to the charging and/or powering of electronic devices (e.g., consumer electronic devices), and more particularly to improving an efficiency at which such devices are charged. Accordingly, a length of time that is required to fully charge a device may be shortened.

Background

Electronic devices may draw power from a battery (e.g., an internal battery).

Power for charging the battery, as well as for powering the electronic device, may be supplied by connecting the device to an electrical outlet (e.g., a wall outlet) via a second device. The second device may be a wall charger such as an AC (alternating current) adapter. Commonly performed, connecting the device to an electrical outlet has proven to be an effective way of charging the battery.

SUMMARY

In an aspect of the disclosure, a method, a computer-readable medium, and an apparatus are provided. The apparatus detects a level of power received from each of a plurality of sources. The apparatus directs the power received from a first source of the plurality of sources to a charging circuit and directs the power received from at least a second source of the plurality of sources to the charging circuit. The apparatus directs the power received from the first source to the charging circuit by: comparing the detected level of the power received from the first source with a threshold, and directing the power received from the first source to the charging circuit based on a result of the comparison of the detected level of the power received from the first source with the threshold. The apparatus directs the power received from the at least a second source to the charging circuit by: comparing the detected level of the power received from the at least a second source with the threshold, and directing the power received from the at least a second source to the charging circuit based on a result of the comparison of the detected level of the power received from the at least a second source with the threshold.

In one aspect, an apparatus includes a controller, a detector configured to detect a level of power received from each of a plurality of sources, and a multiplexer controllable by the controller to direct the power received from a first source of the plurality of sources to a charging circuit, and to direct the power received from at least a second source of the plurality of sources to the charging circuit. The controller is configured to control the multiplexer to direct the power received from the first source to the charging circuit by: comparing the detected level of the power received from the first source with a threshold; and controlling the multiplexer to direct the power received from the first source to the charging circuit based on a result of the comparison of the detected level of the power received from the first source with the threshold. The controller is configured to control the multiplexer to direct the power received from the at least a second source to the charging circuit by: comparing the detected level of the power received from the at least a second source with the threshold; and controlling the multiplexer to direct the power received from the at least a second source to the charging circuit based on a result of the comparison of the detected level of the power received from the at least a second source with the threshold.

The multiplexer may be controllable by the controller to direct the power received from the first source to the charging circuit and direct the power received from the at least a second source to the charging circuit concurrently such that a sum of the power received from the first source and the power received from the at least a second source is directed to the charging circuit. The controller may be further configured to control the multiplexer to direct the power received from the first source to the charging circuit based on the result of the comparison by controlling the multiplexer to direct the power received from the first source to the charging circuit if the detected level of the power received from the first source is greater than the threshold. The controller may be further configured to control the multiplexer to direct the power received from the at least a second source to the charging circuit based on the result of the comparison by controlling the multiplexer to direct the power received from the at least a second source to the charging circuit if the detected level of the power received from the at least a second source is greater than the threshold.

The threshold may be based on an operating power of the charging circuit. The threshold may be variable.

The controller may be further configured to control the multiplexer to direct the power received from the first source to the charging circuit based on the result of the comparison by: controlling the multiplexer to direct the power received from the first source to the charging circuit if the detected level of the power received from the first source is greater than the threshold; and controlling the multiplexer to direct the power received from the first source to a storage module if the detected level of the power received from the first source is less than or equal to the threshold.

The detector may be further configured to detect a level of power stored by the storage module. The controller may be further configured to control the multiplexer to direct the power stored by the storage module to the charging circuit if the detected level of the power stored by the storage module is greater than the threshold.

The multiplexer may be controllable by the controller to direct the power received from the first source to the charging circuit and to direct the power stored by the storage module to the charging circuit concurrently such that a sum of the power received from the first source and the power stored by the storage module is directed to the charging circuit.

The first source may include a first sensor, and the at least a second source may include at least a second sensor. Each of the first sensor and the at least a second sensor may include at least a laser sensor, an ultrasonic sensor, a light sensor, a radio frequency (RF) antenna, a millimeter-wave (mm-wave) antenna, a Universal Serial Bus (USB) connector, a sonic sensor, a solar sensor or a pressure sensor. The first sensor and the at least a second sensor may be of different types.

DETAILED DESCRIPTION

Figure 1:
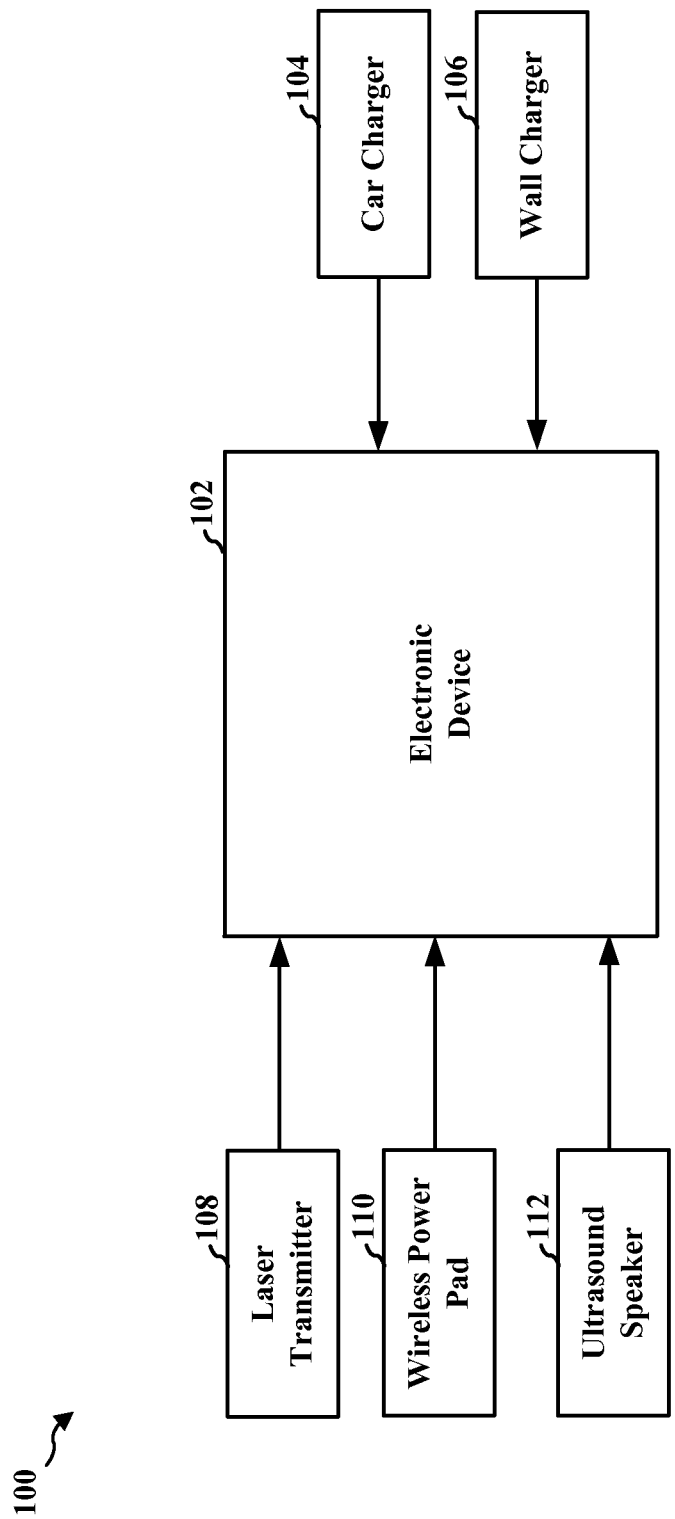
FIG. 1 illustrates a configuration of an electronic device and charging devices.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of improving an efficiency at which electronic devices are charged and/or powered, are presented below with reference to various apparatuses and methods. These apparatuses and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

Wired charging (e.g., via an electrical outlet) has proven to be an effective way of charging electronic devices. According to aspects of the disclosure, power transfer and/or battery charging are performed using two or more techniques. These techniques may include wireless techniques that do not require the use of interconnecting wires. For example, power may be drawn from sources including light, thermal energy, solar energy, sonic energy (e.g., ultrasonic energy), pressure energy, inductive energy and other sources of wireless energy. According to particular aspects, wireless charging and ultrasonic energy may be of particular interest.

Aspects of the disclosure are directed to improving the rate and/or efficiency at which electronic devices are charged. For example, according to various aspects, power is drawn from two or more different sources concurrently, such that the energy from the different sources can be harvested at the same time or sequentially. As will be described in more detail later, power from different devices/sources or sensors may be measured, analyzed and then used together or separately to perform charging of an electronic device. A battery that is internal to or external of the electronic device may be charged.

With reference to the configuration 100 of FIG. 1, an electronic device 102 (e.g., a mobile device) and charging devices are illustrated. The electronic device 102 may be a portable electronic device such as a mobile terminal, a cellular telephone or a notebook computer. The electronic device 102 is configured to receive power from each of the charging devices.

Examples of the charging devices may include car charger 104, wall charger 106, laser transmitter 108, wireless power pad (e.g., wireless charging pad) 110 and ultrasound speaker 112. The electronic device 102 may receive power from any two or more of the charging devices at a particular time.

The car charger 104 may supply electrical power to the electronic device 102 by being connected to an outlet in an automobile, such as a cigarette lighter receptacle. The wall charger 106 may supply electrical power to the electronic device 102 by being connected to an electrical outlet (e.g., a wall outlet).

The laser transmitter 108 emits electromagnetic radiation in the form of a laser (e.g., a laser having a wavelength ranging from tens of nanometers to tens of micrometers). When an emitter of the laser transmitter 108 is pointed at the electronic device 102 (e.g., at a suitable receiver such as a photovoltaic cell), the laser may be transmitted through a wireless medium such as air. Power is effectively provided to the electronic device 102 when the laser is converted to electrical energy.

The wireless charging pad 110 may supply power to the electronic device 102 via electrodynamic induction. For example, electric current may flow through a coil (e.g., a primary coil) of the wireless charging pad 110. The electric current creates a magnetic field that may be carried on a wireless medium such as air. The magnetic field acts on the electronic device 102 (e.g., on a secondary coil at the electronic device), thereby producing a current at the electronic device. As such, electrical energy is provided to the electronic device 102.

The ultrasound speaker 112 converts electrical energy to ultrasonic energy in the form of ultrasonic waves (e.g., sound waves having a frequency from about 20 to about 120 kHz). The ultrasonic waves may be carried via a wireless medium such as air. Power is effectively provided to the electronic device 102 when the ultrasonic waves are converted to electrical energy (e.g., by a receiving transducer at the electronic device).

Figure 2:
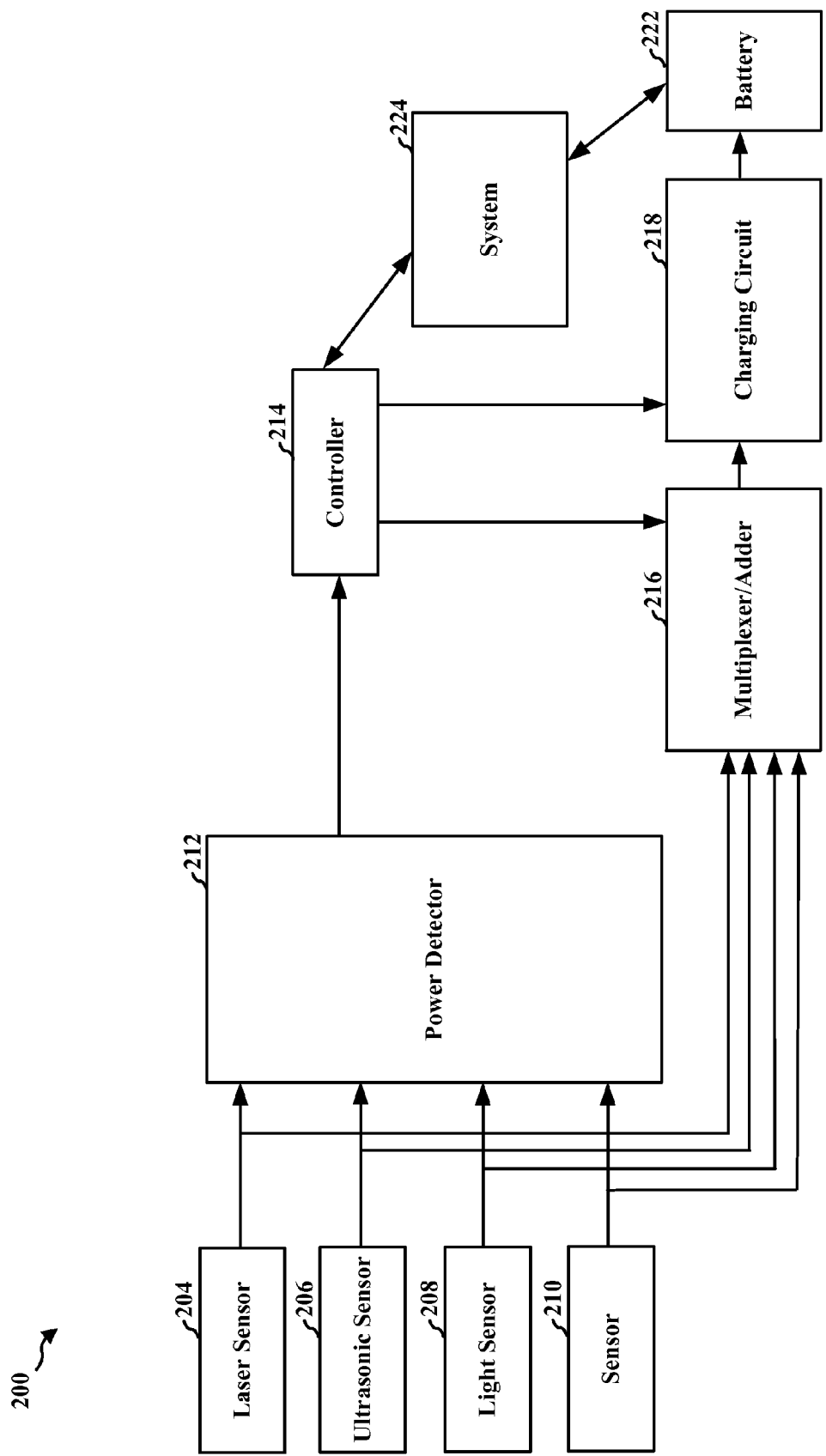
FIG. 2 is a block diagram of an electronic device.

FIG. 2 is a block diagram 200 of an electronic device (e.g., electronic device 102) according to one embodiment. The electronic device includes sensors, examples of which include laser sensor 204, ultrasonic sensor 206, light sensor 208 and sensor 210. The electronic device also includes power detector 212, controller 214, multiplexer/adder 216, charging circuit 218 (which may be an on-chip charging circuit), battery 222 and system 224.

The laser sensor 204 senses a laser that may be received. For example, the received laser may be a laser that is output by the laser transmitter 108. The laser sensor 204 senses the laser and converts the energy carried by the laser to electrical power. The electrical power is output to an input (e.g., a respective input) of the power detector 212 and to an input (e.g., a respective input) of the multiplexer/adder 216.

The ultrasonic sensor 206 senses an ultrasonic wave that may be received. For example, the received ultrasonic wave may be an ultrasonic wave that is output by ultrasound speaker 112. The ultrasonic sensor 206 senses the ultrasonic wave and converts the energy carried by the ultrasonic wave to electrical energy. The electrical energy is output to an input (e.g., a respective input) of the power detector 212 and to an input (e.g., a respective input) of the multiplexer/adder 216.

The light sensor 208 senses light that may be received. For example, the received light may include solar light. The light sensor 208 senses the light and converts the energy carried by the light to electrical energy. The electrical energy is output to an input (e.g., a respective input) of the power detector 212 and to an input (e.g., a respective input) of the multiplexer/adder 216.

The sensor 210 senses any of various inputs that may be received. For example, the received input may be magnetic energy produced by the wireless charging pad 110. The received input may also be energy provided by the car charger 104 or the wall charger 106. The received input may also be energy provided by a universal serial bus (USB) charger. The received input may carry other forms of energy such as sonic energy (e.g., ultrasonic energy), radio frequency (RF) energy (e.g., millimeter-wave energy), or pressure energy. The sensor 210 senses the input and, if applicable, converts the energy carried by the input to electrical energy. The electrical energy is output to an input (e.g., a respective input) of the power detector 212 and to an input (e.g., a respective input) of the multiplexer/adder 216.

The sensors 204, 206, 208 and 210 are coupled to the power detector 212. The power detector 212 detects the level (e.g., amplitude) of the power that is produced by each of the sensors 204, 206, 208 and 210. For example, the power detector 212 detects the level of the power that is output by the laser sensor 204. As described earlier, the laser sensor 204 converts the energy carried by a laser (e.g., a laser transmitted by the laser transmitter 108) to electrical energy. The power detector 212 detects the level of this electrical energy.

Similarly, the power detector 212 detects the level of the power that is output by the ultrasonic sensor 206. As described earlier, the ultrasonic sensor 206 converts the energy carried by an ultrasonic wave (e.g., an ultrasonic wave produced by the ultrasound speaker 112) to electrical energy. The power detector 212 detects the level of this electrical energy.

Similarly, the power detector 212 detects the level of the electrical energy that is output by the light sensor 208 and the sensor 210.

The power detector 212 provides the detected power levels to the controller 214.

As will be described in more detail below, the controller 214 may selectively direct (or route) power produced by one or more sensors (e.g., one or more of the sensors 204, 206, 208 and/or 210) to the charging circuit 218.

For example, an output of the controller 214 is coupled to an input (e.g., a control input) of the multiplexer/adder 216. As described earlier, the power produced by each of the sensors 204, 206, 208, 210 is output to inputs of the multiplexer/adder 216. Based on the control by the controller 214, the multiplexer/adder 216 directs power produced by the sensor(s) 204, 206, 208 and/or 210 to the charging circuit 218. As will be described in more detail later, the multiplexer/adder 216 may be controlled to effectively connect more than one channel to the charging circuit 218 at the same time. For example, the multiplexer/adder 216 may function as a summer or an adder in adding power produced by two or more of the sensors 204, 206, 208, 210 and outputting the sum power to the charging circuit 218.

Also, an output of the controller 214 is coupled to an input of the charging circuit 218. Based on the input from the controller 214, the charging circuit 218 may be turned on/off. For example, the controller 214 may turn on the charging circuit 218 when the multiplexer/adder 216 is controlled to output power to the charging circuit. As a further example, during other times (e.g., when the multiplexer/adder 216 does not output power to the charging circuit 218), the controller 214 may turn off the charging circuit 218.

According to various aspects, the controller 214 controls the multiplexer/adder 216 to direct one or more of the power output by the sensor 204, the power output by the sensor 206, the power output by the sensor 208 or the power output by the sensor 210 to the charging circuit 218 based on the power levels detected by the power detector 212. According to particular aspects, the controller 214 controls the multiplexer/adder 216 to direct the power to the charging circuit 218 based on comparing the detected power levels against a particular threshold.

For example, the controller 214 may control the multiplexer/adder 216 to direct the power that is output by only one sensor to the charging circuit 218. This may occur if the level of the power that is output by the one sensor is determined to be above the threshold, and the power levels corresponding to the remaining sensors are all determined to be at or below the threshold. For example, with reference to FIG. 2, the controller 214 may control the multiplexer/adder 216 to direct the power output by only the sensor 204 to the charging circuit 218 if the detected level of the power output by the sensor 204 is determined to be above the threshold and the respective power levels corresponding to the sensors 206, 208 and 210 are all determined to be at or below the threshold. In this example, the power produced by the sensors 206, 208 and 210 is not directed to the charging circuit 218.

As another example, the controller 214 may control the multiplexer/adder 216 to direct power that is output by two or more of the sensors to the charging circuit 218. This may occur, for example, if the level of the power that is output by one sensor is determined to be above the threshold and the level of the power that is output by another sensor is also determined to be above the threshold, and the power levels corresponding to the remaining sensors are all determined to be at or below the threshold. For example, with reference to FIG. 2, the controller 214 may control the multiplexer/adder 216 to direct the power output by the sensor 206 and the power output by the sensor 208 to the charging circuit 218 if the detected level of the power output by the sensor 206 is determined to be above the threshold, the detected level of the power output by the sensor 208 is also determined to be above the threshold, and the respective power levels corresponding to the sensors 204 and 210 are all determined to be at or below the threshold. In this example, the multiplexer/adder 216 may add the power output by the sensor 206 and the power output by the sensor 208, and provide the total summed power to the charging circuit 218. In this example, the power produced by the sensors 204 and 210 is not directed to the charging circuit 218.

According to one aspect, the threshold against which the detected power levels are compared is related to the nominal operating power of the charging circuit 218. For example, the threshold may be more than a multiple of (e.g., two or three times) the nominal operating power of the charging circuit 218. Accordingly, the power that is directed to the charging circuit 218 from any one of the sensors 204, 206, 208, 210 is more than two times the power that is required to operate the charging circuit 218. Therefore, operation of the charging circuit 218 should not consume more power than the power that the charging circuit receives from the multiplexer/adder 216.

According to a further aspect, the threshold against which the detected power levels are compared is related not only to the nominal operating power of the charging circuit 218, but also a system operating power of the electronic device (e.g., the electronic device 102). The system operating power may include power consumed by other components of the device, including a display, a speaker, memory components, processors and/or other components that may be commonly used in a typical consumer electronic device.

According to another aspect, the threshold is variable and/or programmable (e.g., user programmable). For example, the threshold may be varied/programmed based on various factors. The factors may include a desired battery charge time. For example, if the battery 222 of the electronic device is to be charged more quickly, then the threshold may be lowered. Conversely, if the battery 222 is to be charged more slowly (e.g., when charging of the battery 222 is to be performed overnight), then the threshold may be increased. Increasing the threshold may reduce the number of sources that are used to charge the battery 222 because only the sources that produce a higher level of power are used for charging.

The factors may also include safety limits of the battery 222 and/or of internal circuits of the electronic device (e.g., electronic device 102).

According to another aspect, based on the detected power levels in relation to each other, the controller 214 selects power that is output by one or more of the sensors (over power that is output by one or more other sensors) and controls the multiplexer/adder 216 to output only the selected power to the charging circuit 218. For example, if the detected power level corresponding to the sensor 204 is greater than each of the detected power level corresponding to the sensor 206, the detected power level corresponding to the sensor 208 and the detected power level corresponding to the sensor 210, then the controller 214 may select the power that is output by the sensor 204 and control the multiplexer/adder 216 to output the power from the sensor 204 to the charging circuit 218. In this example, the power output by the sensors 206, 208 and 210 is not directed to the charging circuit 218.

As another example, if the detected power level corresponding to the sensor 204 and the detected power level corresponding to the sensor 206 are individually greater than the respective detected power levels corresponding to the sensor 208 and the sensor 210, then the controller 214 may select the power that is output by the sensor 204 and by the sensor 206 and control the multiplexer/adder 216 to output the power from the sensor 204 and the power from the sensor 206 to the charging circuit 218. In this example, the multiplexer/adder 216 may add the power output by the sensor 204 and the power output by the sensor 206, and provide the total summed power to the charging circuit 218. In this example, the power output by the sensors 208 and 210 is not directed to the charging circuit 218.

The charging circuit 218 uses power received from the multiplexer/adder 216 to charge the electronic device 102 (e.g., to charge the battery 222). For example, the charging circuit 218 may perform the necessary regulation and/or other processes in order to properly charge the electronic device 102. Alternatively (or in addition), the charging circuit 218 may use the power received from the multiplexer/adder 216 to support current operations at the electronic device 102.

The charging circuit 218 may include components such as low dropout regulators, linear regulators, switching regulators, charge pumps, buck converters, boost converters, and/or other types of DC (direct current)-to-DC converters. Because certain power sources may produce AC power rather than DC power, the charging circuit may include rectifiers or other types of AC-to-DC converters.

A charge status of the battery 222 may indicate the level at which the battery is charged. The charge status may be provided to the controller 214 via the system 224.

Figure 3:
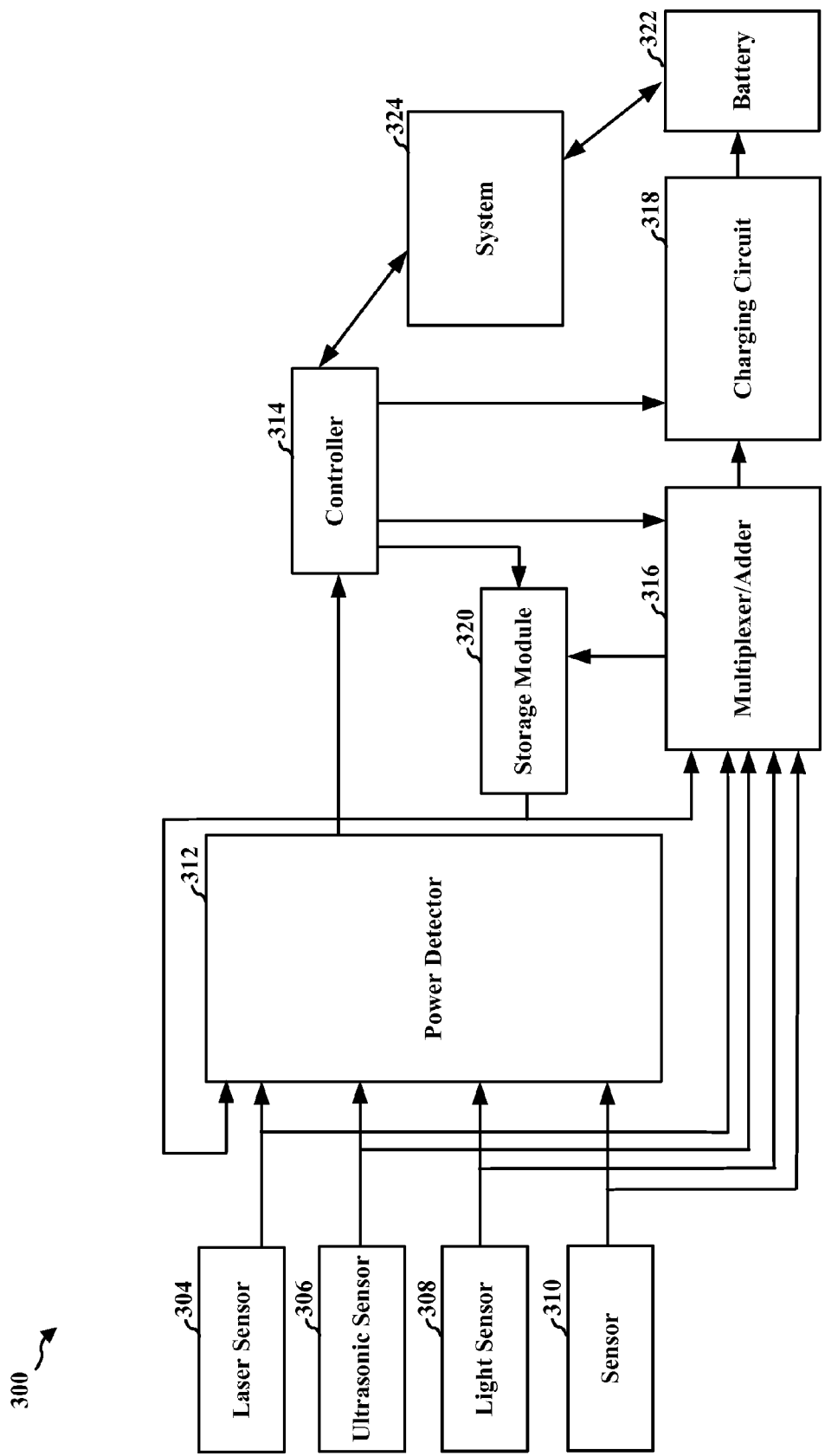
FIG. 3 is a block diagram of an electronic device.

FIG. 3 is a block diagram 300 of an electronic device (e.g., electronic device 102) according to one embodiment. The electronic device 300 includes sensors, including laser sensor 304, ultrasonic sensor 306, light sensor 308 and sensor 310. The sensors 304, 306, 308 and 310 may be similar to sensors 204, 206, 208 and 210 of FIG. 2, respectively, and, therefore, will not be described in further detail below.

The electronic device further includes power detector 312, controller 314, multiplexer/adder 316, charging circuit 318, battery 322 and system 324. The power detector 312, controller 314, multiplexer/adder 316, charging circuit 318, battery 322 and system 324 may be largely similar to the power detector 212, controller 214, multiplexer/adder 216, on-chip charging circuit 218, battery 222 and system 224, respectively. Therefore, similarities between these devices will generally not be described below. However, selected differences between the electronic device of FIG. 2 and that of FIG. 3 will now be described in more detail.

With reference to FIG. 3, the electronic device further includes storage module 320. The storage module 320 may be a capacitor, an inductor, or a similar device or a circuit suitable for storing electrical energy and for discharging stored energy.

An output of the controller 314 may be coupled to an input of the storage module 320. As will be described in more detail later, the storage module 320 may include two or more separate storage devices. In this situation, the controller 314 may control, in an individualized manner, the power that is input to each of the storage devices. Also, an output of the multiplexer/adder 316 may be coupled to an input of the storage module 320.

An output of the storage module 320 is coupled to a corresponding input of the power detector 312 and to a corresponding input of the multiplexer/adder 316. According to one aspect, the controller 314 controls the multiplexer/adder 316 to direct, to the storage module 320, power that has not been directed to the charging circuit 318. The storage module 320 may store the power for a later use (e.g., for a later charging of the electronic device via the charging circuit 318).

For example, according to an example described earlier with reference to FIG. 2, the controller 214 may control the multiplexer/adder 216 to direct the power output by only the sensor 204 to the charging circuit 218 if the detected level of the power output by the sensor 204 is determined to be above a threshold and the respective power levels corresponding to the sensors 206, 208 and 210 are all determined to be at or below the threshold. As also described earlier, the power produced by the sensors 206, 208 and 210 is not directed to the charging circuit 218.

In a similar manner, with reference to FIG. 3, the controller 314 may control the multiplexer/adder 316 to direct the power output by only the sensor 304 to the charging circuit 318 if the detected level of the power output by the sensor 304 is determined to be above a threshold and the respective power levels corresponding to the sensors 306, 308 and 310 are all determined to be at or below the threshold. In this situation, the power produced by the sensors 306, 308 and 310 is not directed to the charging circuit 318. Rather, the controller 314 may control the multiplexer/adder 316 to direct the power produced by the sensors 306, 308 and 310 to the storage module 320. The storage module 320 stores the power for a later use.

As noted earlier, an output of the storage module 320 is coupled to an input of the power detector 312. Accordingly, the power detector 312 can detect a level of the power that is stored in the storage module 320. The detected level is provided to the controller 314.

If the controller 314 determines that the detected power level corresponding to the storage module 320 is above a threshold, the controller 314 may control the multiplexer/adder 316 to direct the power stored in the storage module 320 to the charging circuit 318. As such, the power that is stored in the storage module 320 is discharged. The discharging of the storage module 320 may be continued until the level of the power that is stored in the storage module 320 falls below the threshold. At that time, the controller 314 may control the multiplexer/adder 316 to cease directing the power stored in the storage module 320 to the charging circuit 318.

It is understood that the power stored in the storage module 320 may be directed to the charging circuit 318 together (e.g., simultaneously) with power from one or more of the sensors 304, 306, 308 and/or 310. For example, if the controller 314 determines that the detected power level corresponding to the storage module 320 is above a threshold and the detected level of the power output by the sensor 304 is above the threshold, the controller 314 may control the multiplexer/adder 316 to direct the power stored in the storage module 320 and the power produced by the sensor 304 to the charging circuit 318. For example, a sum of the power stored in the storage module 320 and the power produced by the sensor 304 may be output to the charging circuit 318. Accordingly, the efficiency at which the electronic device is charged may be further increased.

According to one aspect, the storage module 320 may include two or more storage devices. Power may be directed to the storage devices independently of one another, and the storage devices may be discharged independently of one another. For example, one of the storage devices may receive power from one or more of the sensors 304, 306, 308 and/or 310, while power that is stored in another storage device may be directed to the charging circuit 318.

According to one aspect, when a battery 322 of an electronic device (e.g., electronic device 102) is fully charged, then the charging of the battery 322 may be disabled. In this situation, with reference to FIG. 3, the controller 314 may control the multiplexer/adder 316 to direct power output by one or more of the sensors 304, 306, 308 and/or 310 to the storage module 320 even if the detected level(s) of the power output by the sensor(s) is/are determined to be above a threshold. When both the battery 322 is fully charged and the storage module 320 is fully charged (e.g., the storage module 320 has reached its full storage capacity), the controller 314 may power down particular devices (e.g., power detector 312) and/or control the devices to operate in a low power mode. When it is determined that the battery 322 and/or the storage module 320 are/is no longer fully charged, then the controller 314 may control the power detector 312 to periodically detect the power output by the sensors 304, 306, 308, 310. For example, the periodic detection may be performed based on a clock (e.g., a 32 kHz clock). Similarly, with reference to FIG. 2, when it is determined that the battery 222 is no longer fully charged, then the controller 214 may control the power detector 212 to periodically detect the power output by the sensors 204, 206, 208, 210.

In embodiments described earlier with reference to FIGS. 2 and 3, power from different sources (e.g., sources of different types) may be used to charge an electronic device either at the same time or sequentially. For example, a controller (e.g., the controller 214, 314) may selectively control a multiplexer/adder (e.g., the multiplexer/adder 216, 316) to output power from one or more sources to a charging circuit (e.g., the charging circuit 218, 318). When power output by two or more sources is directed to the charging circuit, the charging of an electronic device (e.g., the electronic device 102) may be accelerated. With reference to FIG. 3, power that is output by one or more sources may be temporarily stored in a storage module (e.g., the storage module 320). Power may be temporarily stored when the power may not be at a sufficient high level(s) to warrant operation of the charging circuit.

Figure 4:
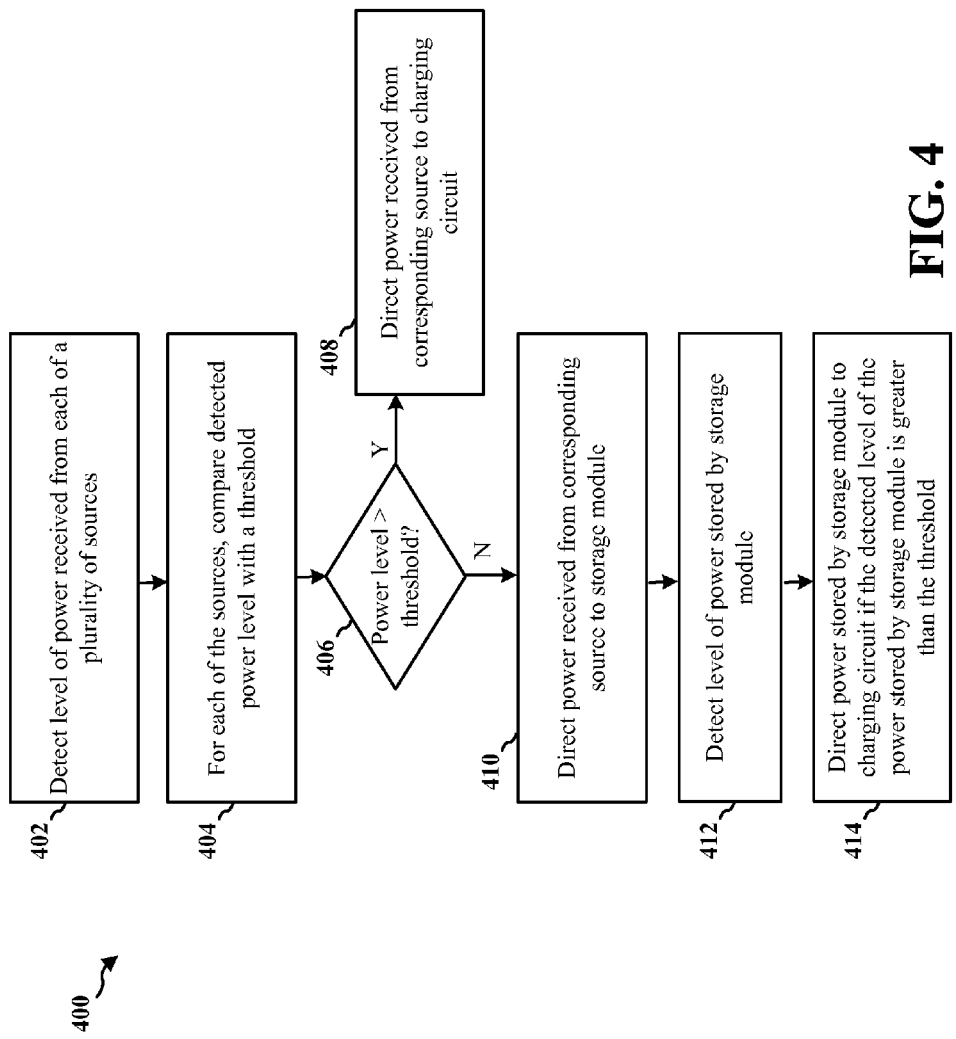
FIG. 4 is a flow chart of a method of operating a device.

FIG. 4 is a flow chart 400 of a method of operating a device. At 402, a device (e.g., electronic device 102 of FIG. 1) detects a level of power that is received from each of a plurality of sources. For example, with reference to FIG. 2, the power detector 212 detects a level of power that is received from each of sensors 204, 206, 208, 210. At 404, for each of the sources, the device may compare the detected power level against a threshold. For example, with reference to FIG. 2, the power that is received from sensor 204 is compared with a threshold. If the detected power level corresponding to a given source is determined to be higher than (greater than) the threshold (see FIG. 4, 406), then, at 408, the power received from that source is directed to a charging circuit. For example, with reference to FIG. 2, the power that is received from the sensor 204 is directed to the charging circuit 218. It is understood that power output by multiple sensors may be multiplexed (e.g., added) together and directed to the charging circuit.

If the detected power corresponding to the given source is determined to be at or below (less than or equal to) the threshold (see FIG. 4, 406), then, at 410, the power received from that source is not directed to the charging circuit, and, instead, is directed to a power storage. For example, with reference to FIG. 3, the power that is received from the sensors 306, 308, 310 may be directed to the storage module 320. At 412, the level of the power stored by the storage module is detected by the electronic device. At 414, the power stored by the storage module is directed to the charging circuit if the detected level of the power stored by the storage module is greater than the threshold. For example, with reference to FIG. 3, the power that is stored by the storage module 320 is directed to the charging circuit 318.

Figure 5:
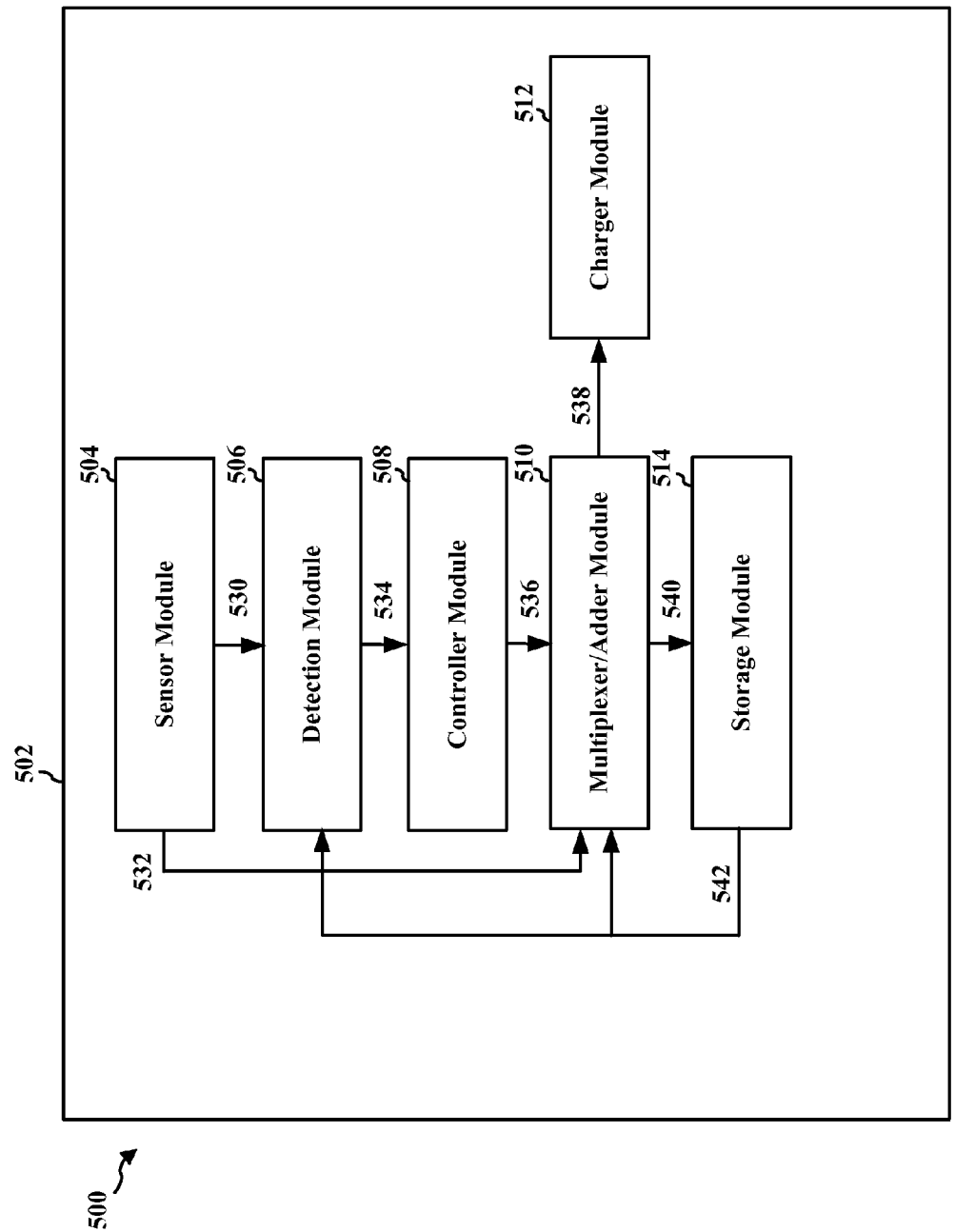
FIG. 5 is a conceptual data flow diagram illustrating the data flow between different modules/means/components in an exemplary apparatus.

FIG. 5 is a conceptual data flow diagram 500 illustrating the data flow between different modules/means/components in an exemplary apparatus 502. The apparatus may be a mobile terminal. The apparatus 502 may include one or more sensor modules 504, a detection module 506, a controller module 508, a multiplexer/adder module 510 and a charger module 512. The apparatus may further include a storage module 514.

The sensor module 504 senses energy that is carried by a source and converts the energy to electrical power. The sensor module 504 provides the electrical power to the detection module 506 as output 530 and to the multiplexer/adder module 510 as output 532. The detection module 506 detects a level of power that is output by each of the sensor modules 504. The detection module 506 provides the detected power level for each of the sensor modules 504 to the controller module 508 as output 534.

Based on a detected power level, the controller module 508 may control the multiplexer/adder module 510 to direct the corresponding power to the charger module 512. For example, the controller module 508 may control the multiplexer/adder module 510 (via output 536) to direct the corresponding power to the charger module 512 (as output 538) if the controller module determines that the detected power level is larger than a threshold.

As a further example, the controller module 508 may control the multiplexer/adder module 510 (via output 536) to direct the corresponding power to the storage module 514 (as output 540) if the controller module determines that the detected power level is less than or equal to the threshold. The storage module 514 provides its stored power to the multiplexer/adder module 510 and the detection module 506 as output 542. The detection module 506 detects a level of the power that is stored by the storage module 514. The detection module 506 provides the detected power level to the controller module 508 as output 534. Based on the detected power level, the controller module 508 may control the multiplexer/adder module 510 to direct the power stored by the storage module 514 to the charger module 512. For example, the controller module 508 may control the multiplexer/adder module 510 (via output 536) to direct the power stored by the storage module 514 to the charger module 512 (as output 538) if the controller module determines that the detected power level is larger than a threshold.

The apparatus may include additional modules that perform each of the steps of the algorithm in the aforementioned flow chart of FIG. 4. As such, each step in the aforementioned flow chart of FIG. 4 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 6:
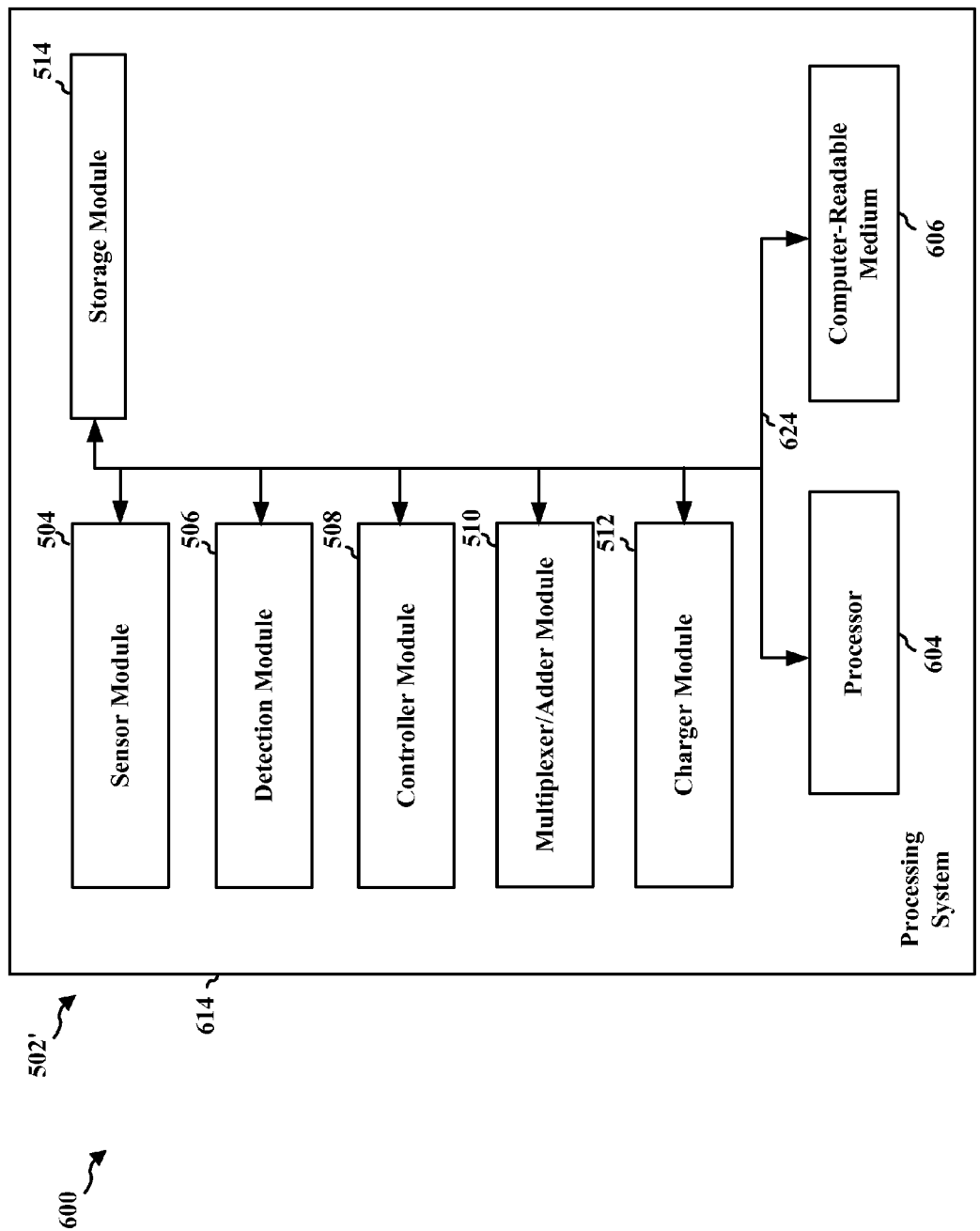
FIG. 6 is a diagram illustrating an example of a hardware implementation for an apparatus employing a processing system.

FIG. 6 is a diagram 600 illustrating an example of a hardware implementation for an apparatus 502' employing a processing system 614. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware modules, represented by the processor 604, the modules 504, 506, 508, 510, 512 and 514 and the computer-readable medium/memory 606. The bus 624 may also link various other circuits such as timing sources, peripherals, voltage regulators, and power management circuits, which are well known in the art, and therefore, will not be described any further.

The processing system 614 includes a processor 604 coupled to a computer-readable medium/memory 606. The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. The processing system further includes at least one of the modules 504, 506, 508, 510, 512 or 514. The modules may be software modules running in the processor 604, resident/stored in the computer readable medium/memory 606, one or more hardware modules coupled to the processor 604, or some combination thereof.

In one configuration, the apparatus 502/502' includes means for detecting (212, 312) a level of power received from each of a plurality of sources. The apparatus 502/502' also includes means for directing (214, 216, 314, 316) the power received from a first source of the plurality of sources to a charging circuit, and means for directing (214, 216, 314, 316) the power received from at least a second source of the plurality of sources to the charging circuit. The means for directing (214, 216, 314, 316) the power received from the first source to the charging circuit is configured to compare the detected level of the power received from the first source with a threshold, and direct the power received from the first source to the charging circuit based on a result of the comparison of the detected level of the power received from the first source with the threshold. The means for directing (214, 216, 314, 316) the power received from the at least a second source to the charging circuit is configured to compare the detected level of the power received from the at least a second source with the threshold, and direct the power received from the at least a second source to the charging circuit based on a result of the comparison of the detected level of the power received from the at least a second source with the threshold.

In one configuration, the means for directing (214, 216, 314, 316) the power received from the first source to the charging circuit is further configured to direct the power received from the first source to the charging circuit based on the result of the comparison by directing the power received from the first source to the charging circuit if the detected level of the power received from the first source is greater than the threshold, and directing the power received from the first source to a storage module if the detected level of the power received from the first source is less than or equal to the threshold.

The aforementioned means may be one or more of the aforementioned modules of the apparatus 502 and/or the processing system 614 of the apparatus 502' configured to perform the functions recited by the aforementioned means. As described supra, the processing system 614 may include the processor 604. As such, in one configuration, the aforementioned means may be the processor 604 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of operating an apparatus, comprising:
    detecting a level of power received from each of a plurality of sources;
    directing the power received from a first source of the plurality of sources to a charging circuit by:
    comparing the detected level of the power received from the first source with a threshold;
    directing the power received from the first source to the charging circuit if the detected level of the power received from the first source meets a threshold, otherwise directing the power received from the first source to a storage module; and
    directing the power received from at least a second source of the plurality of sources to the charging circuit by:
    comparing the detected level of the power received from the at least a second source with the threshold;
    directing the power received from the at least a second source to the charging circuit if the detected level of the power received from the at least a second source meets a threshold, otherwise directing the power received from the at least a second source to the storage module.

2. The method of claim 1, wherein the directing the power received from the first source to the charging circuit and the directing the power received from the at least a second source to the charging circuit are performed concurrently such that a sum of the power received from the first source and the power received from the at least a second source is directed to the charging circuit.

3. The method of claim 1, wherein the threshold is based on an operating power of the charging circuit.

4. The method of claim 3, wherein the threshold is variable.

5. The method of claim 1, further comprising detecting a level of power stored by the storage module.

6. The method of claim 5, further comprising directing the power stored by the storage module to the charging circuit if the detected level of the power stored by the storage module is greater than the threshold.

7. The method of claim 6, wherein the directing the power received from the first source to the charging circuit and the directing the power stored by the storage module to the charging circuit are performed concurrently such that a sum of the power received from the first source and the power stored by the storage module is directed to the charging circuit.

8. The method of claim 1,
    wherein the first source comprises a first sensor, and
    wherein the at least a second source comprises at least a second sensor.

9. The method of claim 8, wherein each of the first sensor and the at least a second sensor comprises at least a laser sensor, an ultrasonic sensor, a light sensor, a radio frequency (RF) antenna, a millimeter-wave (mm-wave) antenna, a Universal Serial Bus (USB) connector, a sonic sensor, a solar sensor or a pressure sensor.

10. The method of claim 9, wherein the first sensor and the at least a second sensor are of different types.

11. An apparatus, comprising:
    a controller;
    a detector configured to detect a level of power received from each of a plurality of sources; and
    a multiplexer controllable by the controller to direct the power received from a first source of the plurality of sources to a charging circuit, and to direct the power received from at least a second source of the plurality of sources to the charging circuit,
    wherein the controller is configured to control the multiplexer to direct the power received from the first source to the charging circuit by:
    comparing the detected level of the power received from the first source with a threshold;
    controlling the multiplexer to:
    direct the power received from the first source to the charging circuit if the detected level of the power received from the first source meets a threshold, otherwise direct the power received from the first source to a storage module; and
    wherein the controller is configured to control the multiplexer to direct the power received from the at least a second source to the charging circuit by:
    comparing the detected level of the power received from the at least a second source with the threshold; and
    controlling the multiplexer to:
    direct the power received from the at least a second source to the charging circuit if the detected level of the power received from the at least a second source meets a threshold, otherwise direct the power received from the at least a second source to the storage module.

12. The apparatus of claim 11, wherein the multiplexer is controllable by the controller to direct the power received from the first source to the charging circuit and direct the power received from the at least a second source to the charging circuit concurrently such that a sum of the power received from the first source and the power received from the at least a second source is directed to the charging circuit.

13. The apparatus of claim 11, wherein the threshold is based on an operating power of the charging circuit.

14. The apparatus of claim 13, wherein the threshold is variable.

15. The apparatus of claim 11, wherein the detector is further configured to detect a level of power stored by the storage module.

16. The apparatus of claim 15, wherein the controller is further configured to control the multiplexer to direct the power stored by the storage module to the charging circuit if the detected level of the power stored by the storage module is greater than the threshold.

17. The apparatus of claim 16, wherein the multiplexer is controllable by the controller to direct the power received from the first source to the charging circuit and to direct the power stored by the storage module to the charging circuit concurrently such that a sum of the power received from the first source and the power stored by the storage module is directed to the charging circuit.

18. The apparatus of claim 11,
wherein the first source comprises a first sensor, and
wherein the at least a second source comprises at least a second sensor.

19. The apparatus of claim 18, wherein each of the first sensor and the at least a second sensor comprises at least a laser sensor, an ultrasonic sensor, a light sensor, a radio frequency (RF) antenna, a millimeter-wave (mm-wave) antenna, a Universal Serial Bus (USB) connector, a sonic sensor, a solar sensor or a pressure sensor.

20. The apparatus of claim 19, wherein the first sensor and the at least a second sensor are of different types.

21. An apparatus, comprising:
means for detecting a level of power received from each of a plurality of sources;
means for directing the power received from a first source of the plurality of sources to a charging circuit; and
means for directing the power received from at least a second source of the plurality of sources to the charging circuit,
wherein the means for directing the power received from the first source to the charging circuit is configured to:
compare the detected level of the power received from the first source with a threshold;
direct the power received from the first source to the charging circuit if the detected level of the power received from the first source meets a threshold, otherwise direct the power received from the first source to a storage module; and
wherein the means for directing the power received from the at least a second source to the charging circuit is configured to:
compare the detected level of the power received from the at least a second source with the threshold;
direct the power received from the at least a second source to the charging circuit if the detected level of the power received from the at least a second source meets a threshold, otherwise direct the power received from the at least a second source to the storage module.

22. A non-transitory computer-readable medium comprising code that when executed on at least one processor causes the at least one processor to:
detect a level of power received from each of a plurality of sources;
direct the power received from a first source of the plurality of sources to a charging circuit by:
comparing the detected level of the power received from the first source with a threshold;
directing the power received from the first source to the charging circuit if the detected level of the power received from the first source meets a threshold, otherwise directing the power received from the first source to a storage module; and
direct the power received from at least a second source of the plurality of sources to the charging circuit by:
comparing the detected level of the power received from the at least a second source with the threshold;
directing the power received from the at least a second source to the charging circuit if the detected level of the power received from the at least a second source meets a threshold, otherwise directing the power received from the at least a second source to the storage module.

* * * * *